US008228317B2

(12) United States Patent
Ayres

(10) Patent No.: US 8,228,317 B2
(45) Date of Patent: Jul. 24, 2012

(54) ACTIVE MATRIX ARRAY DEVICE

(75) Inventor: John R. A. Ayres, Reigate (GB)

(73) Assignee: Chimei Innolux Corporation, Maio-Li County (TW)

( * ) Notice: Subject to any disclaimer, the term of this patent is extended or adjusted under 35 U.S.C. 154(b) by 1280 days.

(21) Appl. No.: 11/817,037

(22) PCT Filed: Feb. 27, 2006

(86) PCT No.: PCT/IB2006/050603

§ 371 (c)(1), (2), (4) Date: Aug. 24, 2007

(87) PCT Pub. No.: WO2006/092755

PCT Pub. Date: Sep. 8, 2006

(65) Prior Publication Data

US 2008/0165179 A1 Jul. 10, 2008

(30) Foreign Application Priority Data

Mar. 1, 2005 (EP) .................................... 05101572

(51) Int. Cl.
*G06F 3/038* (2006.01)

(52) U.S. Cl. ............ 345/204; 345/80; 345/212; 345/98; 345/205; 345/206; 341/144; 341/145; 341/126

(58) Field of Classification Search .................... 345/55, 345/214.204, 690, 63, 100, 89, 98, 87, 99, 345/95, 90, 205, 92, 80, 206, 212; 341/145, 341/144, 141, 159
See application file for complete search history.

(56) References Cited

U.S. PATENT DOCUMENTS 5,454,013 A * 9/1995 Minami et al. ................ 375/297
5,990,819 A * 11/1999 Fujimori ....................... 341/150
6,304,241 B1 * 10/2001 Udo et al. ....................... 345/96
6,750,835 B2 * 6/2004 Azami ........................... 345/89
(Continued)

FOREIGN PATENT DOCUMENTS

EP 0572974 12/1993
(Continued)

OTHER PUBLICATIONS

Allen, et al., "Switched Capacitor Cicuits", Van Nostrand Reinhold Company, New York, XP002387922, p. 524, paragraph 3—p. 527, paragraph 1; figures 7.3-3, Jan. 1, 1984.

(Continued)

*Primary Examiner* — Lun-Yi Lao
*Assistant Examiner* — Olga Merkoulova
(74) *Attorney, Agent, or Firm* — Thomas, Kayden, Horstemeyer & Risley, LLP

(57) ABSTRACT

An active matrix array device has driver circuitry for providing address signals to the matrix elements, including digital to analogue converter circuitry. This has a voltage selector for selecting a pair of voltages based on a first set of bits of the digital matrix element signal, and a converter arrangement for providing an analogue voltage level derived from the pair of voltages and from a second set of bits of the digital matrix element signal. The converter arrangement comprises first and second digital to analogue converter circuits (30, 32) in parallel and which are adapted to provide an analogue voltage level to an output of the converter arrangement alternately. The invention provides a more efficient use of substrate area for given circuit response requirements.

33 Claims, 7 Drawing Sheets

U.S. PATENT DOCUMENTS

| | | | | |
|---|---|---|---|---|
| 6,970,121 | B1 * | 11/2005 | Sun | 341/144 |
| 2001/0017618 | A1 * | 8/2001 | Azami | 345/204 |
| 2002/0041245 | A1 * | 4/2002 | Brownlow et al. | 341/145 |
| 2002/0190971 | A1 * | 12/2002 | Nakamura et al. | 345/204 |
| 2003/0179122 | A1 * | 9/2003 | Yamamura | 341/150 |
| 2006/0139251 | A1 * | 6/2006 | Morosawa et al. | 345/76 |

FOREIGN PATENT DOCUMENTS

| | | |
|---|---|---|
| FR | 2791832 | 10/2000 |
| JP | 56-104509 | 8/1981 |
| JP | 59030324 | 5/1984 |
| JP | 04-056888 | 2/1992 |
| JP | 10-143116 | 5/1998 |
| JP | 2000-137467 | 5/2000 |
| JP | 2002-026732 | 1/2002 |
| JP | 2003-255916 | 9/2003 |
| WO | 00/60742 | 10/2000 |
| WO | 2004/040543 | 5/2004 |

OTHER PUBLICATIONS

Hoeschele, Jr., "Analog-to-Digital and Digital-to-Analog conversion Techniques", John Wiley and Sons Inc, New York, XP002387923, p. 200, paragraph 3-p. 201, paragraph 1; figure 6.32, Jan. 1, 1994.

International Search Report, Application No. PCT/IB2006/050603, 5 pages, Jan. 26, 2007.

Office Action, Japanese Application No. 2007-557648, 4 pages, Aug. 30, 2011.

JP Office Action for 2007-557648 mailed Jan. 4, 2012.

English Abstract for JP 2000-137467 (May 16, 2000).

English Abstract for JP 10-143116 (May 29, 1998).

English Abstract for JP 2002-026732 (Jan. 25, 2002).

English Abstract for JP 04-056888 (Feb. 24, 1992).

* cited by examiner

ACTIVE MATRIX ARRAY DEVICE

BACKGROUND OF THE INVENTION

1. Field of the Invention

This invention relates to active matrix array devices, and in particular to active matrix devices in which digital to analogue converter circuitry is provided for generating the drive signals for the individual device pixels. For example, the invention relates to display devices. In typical display configurations, analogue drive signals are provided to columns of the active matrix array, and the digital to analogue converter circuitry is then part of the column driver circuitry.

2. Description of the Related Art

Low temperature poly-Si (LTPS) active matrix displays normally have integrated row and source (or column) drivers to reduce interconnect complexity and cost. In the case of the column driver there is also a big incentive to integrate digital-to-analogue converters (DACs), so that the interface to the glass is digital. This reduces the overall cost of the display module and enables the display controller to be fabricated in a standard digital CMOS process flow.

The use of resistor string digital to analogue converters is known in the column driver circuitry of active matrix liquid crystal (LC) displays. A single resistor string is typically used to supply a large number of converter circuits, as this ensures good uniformity of the output voltages of the converters. The resistor string comprises a resistor or a set of resistors connected in series with connections being made at various points along the length of the string. A voltage is applied to each end of the resistor string, and in addition voltages may also be applied to intermediate points along the string. The outputs are taken from various points along the length of the string and the voltages present at these points represent the analogue output voltage levels of the digital to analogue converters. These voltages may be distributed evenly across the voltage range in order to produce a converter with a linear output voltage characteristic, or they may be arranged to produce a non-linear characteristic.

In most cases the drive voltages applied to the source (or column) lines of an active matrix display do not have a linear dependence upon digital code. This is because the source driver output voltages have to correct for the particular voltage dependence of the electro-optical effect being used in the display (e.g. liquid crystal cell or light emitting diode) and then to provide the appropriate brightness versus digital code relationship (gamma correction).

A resistor string provides a convenient way to achieve gamma correction (namely to generate the appropriate non-linear output voltage versus digital code). The resistor string generates a set of reference voltages (64 in the case of a 6 bit DAC). A decoder and voltage selector circuit is then used to decode the digital input and select 1 of the 64 reference voltages. The required nonlinearity can be achieved by changing the value of resistance between the points where outputs are taken from the resistor string and by modifying the values of the voltages applied to points within the resistor string.

This technique has been used in LTPS displays, but suffers from the disadvantage that the design rules used in poly-Si result in much larger decoders than is desirable (particularly for 6 bit DACs or greater).

It is also known that using a 2-stage resistor-capacitor hybrid DAC (T Nakamura et al Asia Display conference proceedings 2001, p 1603) results in a significantly smaller converter. This type of approach was used even earlier in crystalline Si ICs (J W Yang and K W Martin IEEE J. Solid-State Circuits, 24, p 1458 (1989)). In this type of converter, the resistor string is used to generate a number of pairs of reference voltages. The most significant bits (MSBs) are then used to select a pair of reference voltage that are used as the input to the second stage capacitive converter, the digital inputs to which are the LSBs. For example, to achieve a 6 bit conversion the 3 MSBs could be used to select 1 pair of reference voltages (Vl and Vh) from 8 pairs and the 3 LSBs are then used to generate an output voltage between Vl and Vh according to the digital data. The second stage capacitive conversion is linear between Vl and Vh and the gamma correction is provided by the 3 MSB resistor string DAC. The overall conversion can therefore be described as "piece-wise linear".

A block diagram illustrating how such a 6-bit 2-stage DAC can be implemented using known techniques in a LTPS display is shown in FIG. 1.

The DAC 10 comprises a pair of latches 12 for latching the 6 bit pixel data to a first DAC 14 which has as input the 3 most significant bits (MSBs) of the pixel data. This 3 bit DAC 14 functions as a voltage selector, for outputting high and low voltage rails Vh and Vl. These voltage levels are selected from the reference voltages Vrefs from a resistor string 15.

The 3 least significant bits (LSBs) are used to control a 3 bit DAC 16, in the form of a switched capacitor DAC 18 ("C-DAC") and a switched capacitor buffer amplifier 20 ("SC buffer amp"). The output is supplied to the columns of the pixel array through a 3:1 multiplexer and column pre-charge circuit 22.

FIG. 2 shows how the second stage 16 consisting of the 3 LSB capacitive DAC 18 and buffer amplifier 20 can be implemented using known techniques.

The value of the feedback capacitor in FIG. 2 is 8C, which is required to set the correct gain for the inverting amplifier. A value of 8C ensures the output voltage from the amplifier increases linearly from Vl at LSB binary code 000 to Vl+7 (Vh−Vl)/8 at LSB binary code 111. Thus, the voltage increments by (Vh−Vl)/8 in 7 equal steps between code 000 and 111.

The stage 16 is operable in two modes. In a setup mode (with Ck2 high and Ck1 low), the inverting input and output of the amplifier are connected together. This means that one side of the 8C feedback capacitor (24) is charged to the built in offset voltage of the amplifier, while the other side of the feedback capacitor is charged to Vl. At the same time all the input capacitors are charged to Vh.

During an output (or active) mode (with Ck1 high and Ck2 low), the input voltages applied to the input capacitors (C, 2C and 4C) are switched from Vh to Vl if the value of the corresponding LSB data bit (B0, B1 and B2) is equal to one. If the LSB data value is equal to zero, the corresponding input voltage remains at Vh. This causes the output voltage of the inverting amplifier to increase linearly with the value LSB data, from Vl at LSB binary code 000 to Vl+7(Vh−Vl)/8 at LSB binary code 111. The resulting output voltage is given by the equation shown in FIG. 2.

The second stage DAC of FIG. 2 is well known and referred to as a charge redistribution switched capacitor converter. It is particularly well suited to LTPS technology because the switched capacitor circuit corrects for offset voltage variations in the amplifier, which are large in LTPS technology due to large variations in the electrical characteristics of the thin film transistors.

In FIG. 2, the amplifier shown is a single input high gain, inverting amplifier. However the same operation can be achieved using any conventional high open-loop gain differential input amplifier where the positive terminal is connected to a grounded potential and the capacitors and feedback are connected to the inverting input.

Although the approach shown in FIGS. 1 and 2 offers a more compact DAC than a single stage resistor string, the layout area using LTPS technology is still undesirably large. For current and future display resolutions this means that it is not possible to have a single DAC per column. Instead, the output from each DAC must be multiplexed across a number of columns. In the example shown in FIG. 1, the multiplex ratio is 3:1, which is fairly typical. The use of multiplexing allows the output of each converter circuit to be connected to one of a number of columns in the display, reducing the amount of circuitry which must be integrated on the display substrate.

In LTPS technology, minimum feature sizes are relatively large (typically several microns), which means that the digital parts (data latches and voltage selector circuits) normally consume a larger area than the LSB capacitor DAC and amplifier. Whilst increasing the multiplex ratio reduces the area of the poly-Si circuits, it also requires the buffer amplifier to be significantly faster. For example, for the case of the 3:1 mutliplex ratio illustrated in FIG. 1 the buffer must reach its settling voltage in just ⅓ of the time compared with a 1:1 ratio. This speed constraint is made worse because the switched capacitor circuit operates over 2 phases of roughly equal period and the output voltage is only valid during the active phase (ck1 high in FIG. 2) and is not valid during the set up phase (ck2 high in FIG. 2). This means for example that in the case of a 3:1 multiplexer the settling time of the amplifier must be less than ⅙ of the line time.

It is clear from the above that there is an amplifier speed versus layout area trade-off, which is a particularly acute in higher resolution displays with a small column pitch.

This invention relates in particular to the implementation of the LSB DAC and the consequences that this has on the number of digital data latches that are required on the data input side.

SUMMARY OF THE INVENTION

According to a first aspect of the invention, there is provided an active matrix array device comprising an array of individually addressable matrix elements and driver circuitry for providing address signals to the matrix elements, the driver circuitry including digital to analogue converter circuitry for converting a digital pixel matrix element signal to an analogue drive level, wherein the digital to analogue converter circuitry comprises:

a voltage selector for selecting a pair of voltages based on a first set of bits of the digital matrix element signal;

a converter arrangement for providing an analogue voltage level derived from the pair of voltages and from a second set of bits of the digital matrix element signal, wherein the converter arrangement comprises first and second digital to analogue converter circuits in parallel and which are adapted to provide an analogue voltage level to an output of the converter arrangement alternately.

In this device, each converter arrangement has two DAC circuits, preferably for only the lowest significant bits of the digital input signal.

The invention can be exploited in two different ways, depending upon the relative importance of layout area versus available charging times. Typically, the analogue output levels are multiplexed before supply to the matrix elements.

In one approach, the multiplex ratio is not changed, and the use of two LSB converter circuits per DAC in accordance with the invention, used alternately, doubles the settling time for the buffer amplifier during the active (or output) phase and also doubles the time available for the setup phase. This results in a doubling of the total number of LSB DACs and buffer amplifiers as each DAC has a pair of LSB DACs. However, because the multiplex ratio is unchanged, the number of data latches and MSB voltage selector circuits remains the same. Consequently, the increase in area of each DAC is much less than a factor of 2 because the data latches and the voltage selector circuit consume most of the area of the DAC. In summary, for a given multiplex ratio, the time available for the setup and active phases can be doubled without doubling the amount of circuitry. This applies for a multiplex ratio of 1, i.e. 1 DAC for every column, and the invention thus provides the same advantage even when multiplexing is not employed.

In a second, alternative, approach, the multiplex ratio can be doubled without decreasing the available setup time and active time. Doubling the multiplex ratio halves the total number of data latches and MSB voltage selector circuits, while the total number of LSB C-DACs and buffers amplifiers remains the same. This significantly reduces the total area consumed by the DACs, without affecting charging times.

The voltage selector is preferably a resistive DAC using the most significant bits of the digital signal. The LSBs may, however, also be used in the voltage selector circuit. This can increase the number of pairs of voltages available to the second converter, at the expense of a more complex voltage selector circuit.

Each digital to analogue converter circuit preferably comprises:

an amplifier; and a switched capacitor input arrangement connected to the amplifier input, wherein the output of the amplifier provides the output of the converter arrangement.

Preferably, a respective one of the pair of voltages is coupled to an input side of each capacitor of the capacitor arrangement through a respective input switch arrangement, and an output side of each capacitor of the capacitor arrangement is coupled to the amplifier input. This provides a weighted switched capacitor arrangement for deriving the desired voltage. The input side of each capacitor of the capacitor arrangement may be coupled to the output of the amplifier through a respective feedback switch.

This feedback arrangement enables the converter circuit to maintain an output even when the input is disconnected. This is because in the active mode the switched capacitor arrangement is connected in the feedback loop and is isolated from the input voltages. When connected into the feedback loop of the amplifier charge is first shared between and then held on these capacitors so that the output voltage of the amplifier is maintained at the correct value. This in turn enables one converter circuit to be loading pixel data while the other is driving the pixels. For this, each feedback switch is controlled with the same timing, and the feedback switches are closed only when the input switching arrangements are open.

According to a second aspect of the invention, there is provided an active matrix array device comprising an array of individually addressable matrix elements and driver circuitry for providing address signals to the matrix elements, the driver circuitry including digital to analogue converter circuitry for converting a digital pixel matrix element signal to an analogue drive level, wherein the digital to analogue converter circuitry comprises:

a voltage selector for selecting a pair of voltages based on a first set of bits of the digital matrix element signal;

a converter arrangement for providing an analogue voltage level derived from the pair of voltages and from a second set of bits of the digital matrix element signal, wherein the converter arrangement comprises an amplifier and a switched capacitor input arrangement connected to the amplifier input, wherein the output of the amplifier provides the output of the converter circuit, and wherein the input side of each capacitor of the capacitor arrangement is coupled to the output of the amplifier through a respective feedback switch.

Again, the converter arrangement preferably comprises first and second digital to analogue converter circuits in parallel and which are adapted to provide an analogue voltage level to an output of the converter arrangement alternately.

In each aspect, each digital to analogue converter circuit is preferably operable in two modes; a setup mode and an active (or output) mode, and wherein when one of the first and second digital to analogue converter circuits is operated in the setup mode, the other is operated in the active (or output) mode. Respective non-overlapping clock signals provide the mode control.

The first set of bits preferably comprises the most significant bits (for example 3) and the second set comprises the least significant bits (for example 3) of the digital signal.

A voltage selector and a converter arrangement can be for providing analogue voltage levels to a plurality of matrix elements, and a multiplexer circuit is provided for switching between the plurality of matrix elements.

Increasing the multiplex ratio has the advantage of reducing the total area consumed by the column driver, but the maximum multiplex ratio is limited by the settling time of the amplifier. The invention enables the multiplex ratio to be increased by a factor of 2 (e.g. from 3:1 to 6:1). Doubling the multiplex ratio in this way halves the amount of circuitry that consumes most of the space, so that overall the total area of the column driver is significantly reduced.

The invention also provides digital to analogue converter circuitry for converting a digital signal to an analogue drive level, comprising:

a voltage selector for selecting a pair of voltages based on a first set of bits of the digital signal;

a converter arrangement for providing an analogue voltage level derived from the pair of voltages and from a second set of bits of the digital signal, wherein the converter arrangement comprises first and second digital to analogue converter circuits in parallel and which are adapted to provide an analogue voltage level to an output of the converter arrangement alternately.

The invention also provides a method of providing address signals to the matrix elements of an active matrix array device comprising an array of individually addressable matrix elements, the method comprising:

selecting a pair of voltages based on a first set of bits of a digital matrix element signal;

providing an analogue voltage level derived from the pair of voltages and from a second set of bits of the digital matrix element signal, wherein the analogue voltage level is provided alternately by first and second digital to analogue converter circuits in parallel.

BRIEF DESCRIPTION OF THE DRAWINGS

Examples of the invention will now be described in detail with reference to the accompanying drawings, in which.

DETAILED DESCRIPTION OF THE INVENTION

The invention provides a digital to analogue converter circuit in which a converter arrangement for the least significant bits has first and second digital to analogue converter circuits in parallel and which are adapted to provide an analogue voltage level to the output of the converter arrangement alternately.

In preferred implementations, each DAC has two switched-capacitor DACs for the least significant bits, and two corresponding buffer amplifiers.

Figure 3:
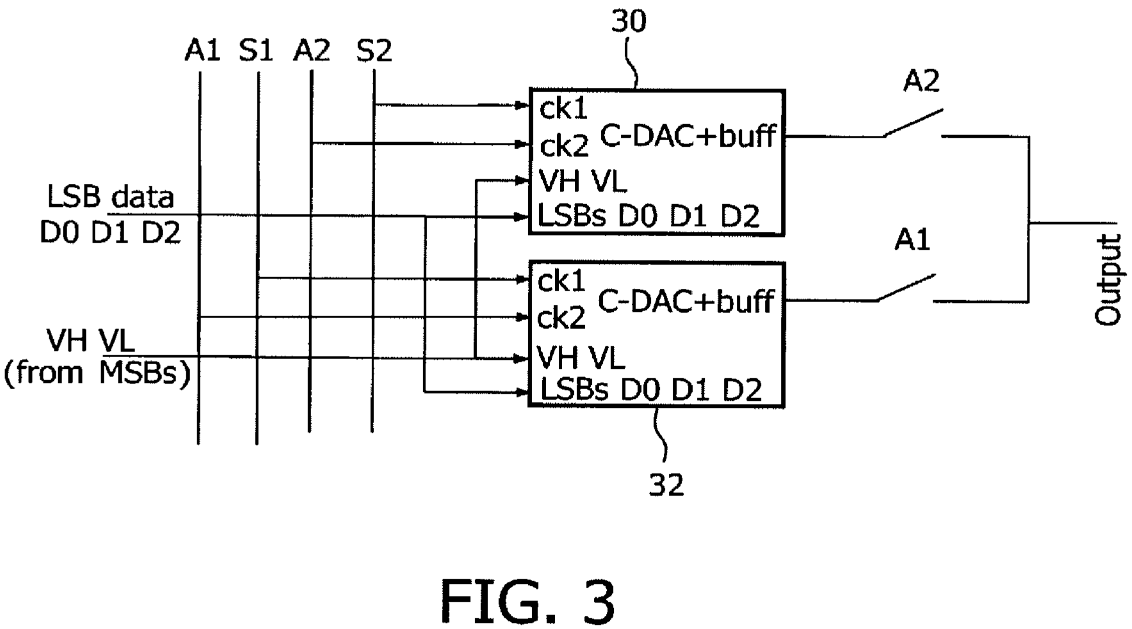
FIG. 3 shows schematically a first example of digital to analogue converter circuit stage of the invention.

FIG. 3 shows an example of LSB DAC part of a DAC circuit of the invention.

FIG. 3 shows the 3 bit LSB data D0, D1, D2 and the voltage rails VH and VL being supplied to the LSB DAC, in the form of first and second digital to analogue converter circuits 30,32 in parallel. These are each implemented as switched capacitor DACs and buffers ("C-DAC+buff"), and they operate in opposite phases. This enables the number of latches and MSB DACs to remain the same.

As shown in FIG. 3, two clock signals are used to control the reset and output phases of each circuit 30,32, and these are used to provide the alternate operation of each circuit.

The circuit 32 has setup clock signal S1 applied to the CK1 input and active clock signal A1 applied to the CK2 input. The circuit 30 has setup clock signal S2 applied to the CK1 input and active clock signal A2 applied to the CK2 input.

FIG. 3 shows a single output circuit, with the outputs from the two circuits 30,32 provided alternately to the eventual output through switches controlled by the active clock signals A1, A2. In the simplest case, S1 and A1 are two phase, non overlapping clock signals, with S1=A2 and S2=A1.

Figure 4:
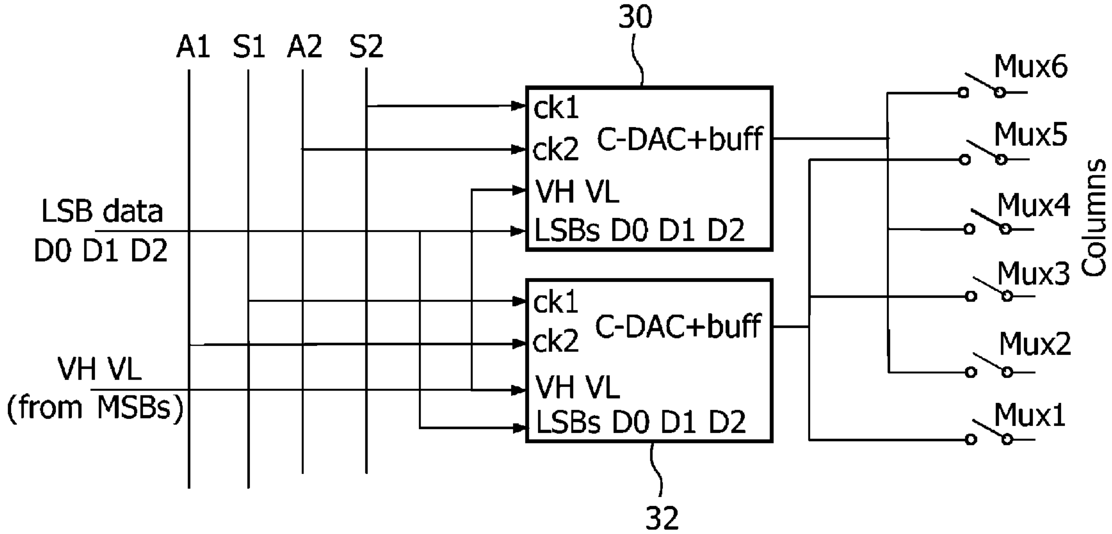
FIG. 4 shows schematically a second example of digital to analogue converter circuit stage of the invention.

FIG. 4 shows schematically the output of each circuit 30,32 being multiplexed to drive six columns of a matrix display. Six columns are thus controlled by both circuits 30,32, with each circuit 30,32 providing the output to three columns, but with the two circuits operation in alternation. A multiplex ratio of 3:1 is provided for each circuit. It will be understood that the converter circuits are in parallel in that they are connected to the same input and are each provided between the input and output of the converter. It will be seen that the two circuits in fact provide the outputs for different columns of pixels, so that the circuits are not connected together at their outputs, and the term "parallel" should be understood in this context.

Doubling the number of LSB DACs and buffers of this stage of the DAC circuit, without increasing the number of data latches and MSB DACs, requires the phases of the 2 buffers to be opposite, so that they can operate independently.

Hence, during the first phase new LSB data and VL and VH values are sampled into the first LSB DAC and buffer 30 (which is in its set-up phase), whilst at the same time the second LSB DAC and buffer 32 is in active mode driving one of the columns. In the second phase, the first LSB DAC and buffer 30 is in active mode driving one of the columns while the second LSB DAC and buffer 32 in its set-up phase and is sampling new LSB data, VL and VH values.

During a first phase, VHa VLa (from the MSBs) and D0*a* D1*a* and D2*a* are applied to the first LSB DAC and then VHb VLb D0*b* D1*b* and D2*b* are applied to the second LSB DAC during the second phase.

Figure 2:
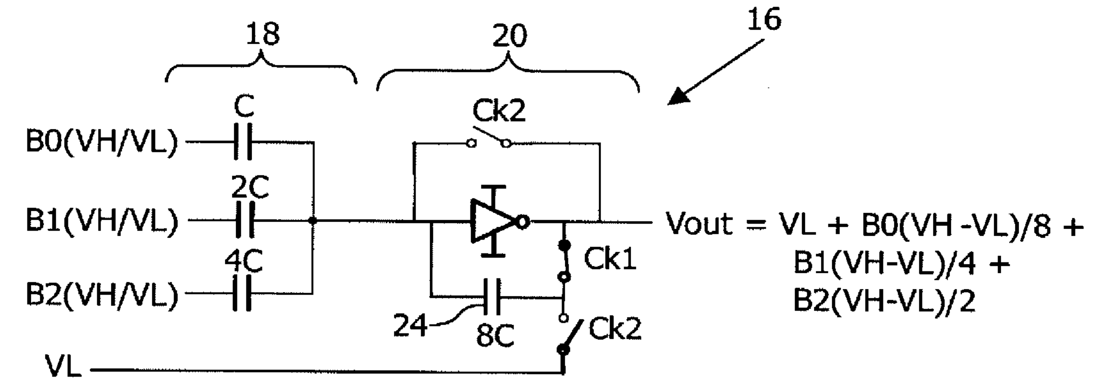
FIG. 2 (PRIOR ART)
FIG. 2 shows in more detail one stage of the circuit of FIG. 1.
Figure 5:
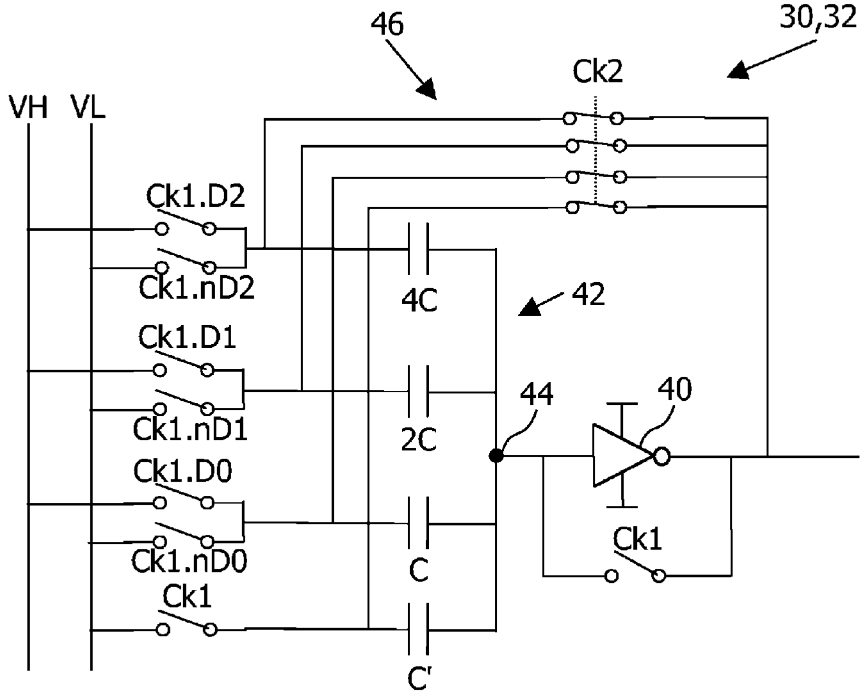
FIG. 5 shows in more detail one part of the circuit of FIGS. 3 and 4.

This operation cannot be achieved with the conventional circuit of FIG. 2, and an example of implementation of the one of the LSB DAC circuits shown schematically in FIGS. 3 and 4 is shown in FIG. 5.

As shown in FIG. 5, each LSB digital to analogue converter circuit again comprises an amplifier 40 and a switched capacitor input arrangement 42 connected to the amplifier input 44. The output of the amplifier 40 provides the output of the LSB DAC converter.

The capacitor arrangement comprises a binary weighted capacitor ladder (C, 2C, 4C), and one of the voltage rails VL, VH is connected to one terminal of each capacitor of this ladder in dependence on the LSB data D0-D2. Input switches, all controlled by the same clock signal Ck1, selectively couple one or other of the voltage rails to the input side of a respective capacitor.

An additional capacitor C' couples the low voltage rail VL to the amplifier input 44, again timed by a switch controlled by the clock signal Ck1.

The input side of each capacitor of the capacitor arrangement (C', C, 2C, 4C) is coupled to the output of the amplifier 44 through a respective feedback switch, in a feedback path 46. Each feedback switch is controlled with the same clock signal Ck2, and the feedback switches are closed only when the input switches are open.

During the active phase (ck2 high), the input side of the capacitors do not need to be connected to the voltage rails VH or VL and similarly the LSB data D0, D1 and D2 is not required. The feedback path 46 results in a common voltage at the input side of each capacitor, and this common voltage provides the desired digital to analogue conversion, which is supplied to the output via the feedback path 46.

In the active mode, the binary weighted capacitors C', C, 2C and 4C are connected in the feedback loop and are isolated from the input voltages. When connected into the feedback loop of the amplifier, charge is first shared between and then held on these capacitors so that the output voltage of the amplifier is maintained at the correct value.

Whilst one DAC is in the active phase, data can be loaded into the other DAC. The amplifier shown in FIG. 5 is again a high gain single input inverting amplifier. This could be achieved using 3 lower gain inverting amplifiers connected in series, which is a known technique. The same function can also be achieved using a differential input operational amplifier circuit where the positive input is connected to ground, while the capacitors and feedback are connected to the inverting input of the amplifier.

Figure 6:
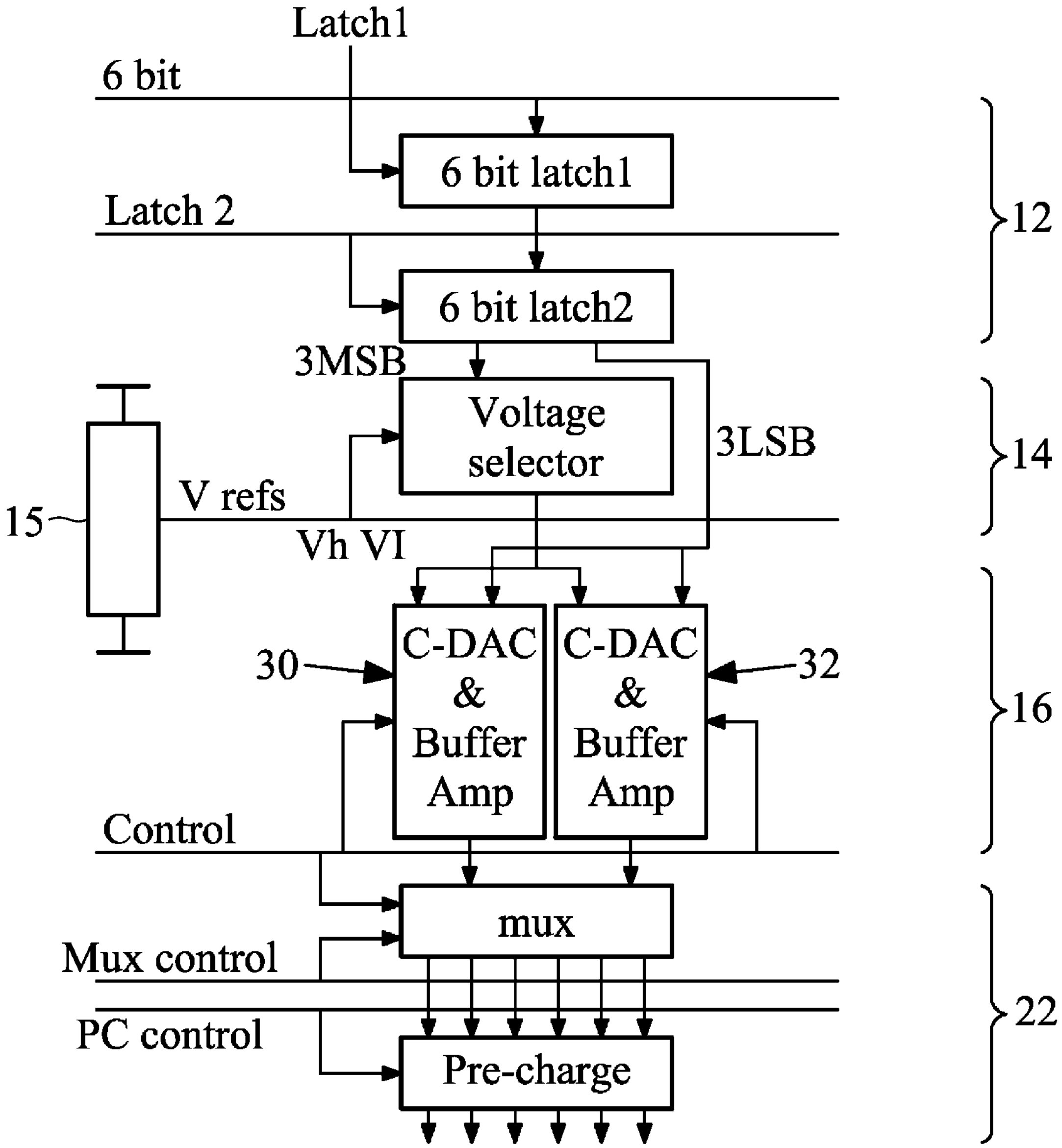
FIG. 6 shows a complete digital to analogue converter circuit of the invention.

FIG. 6 shows the overall architecture of an example of column driver of the invention.

The same reference numerals are used as in FIGS. 2 to 4. The two LSB capacitive DACs and buffers 30,32 are shown shared between one pair of input latches 12 and one MSB DAC 14.

Figure 1:
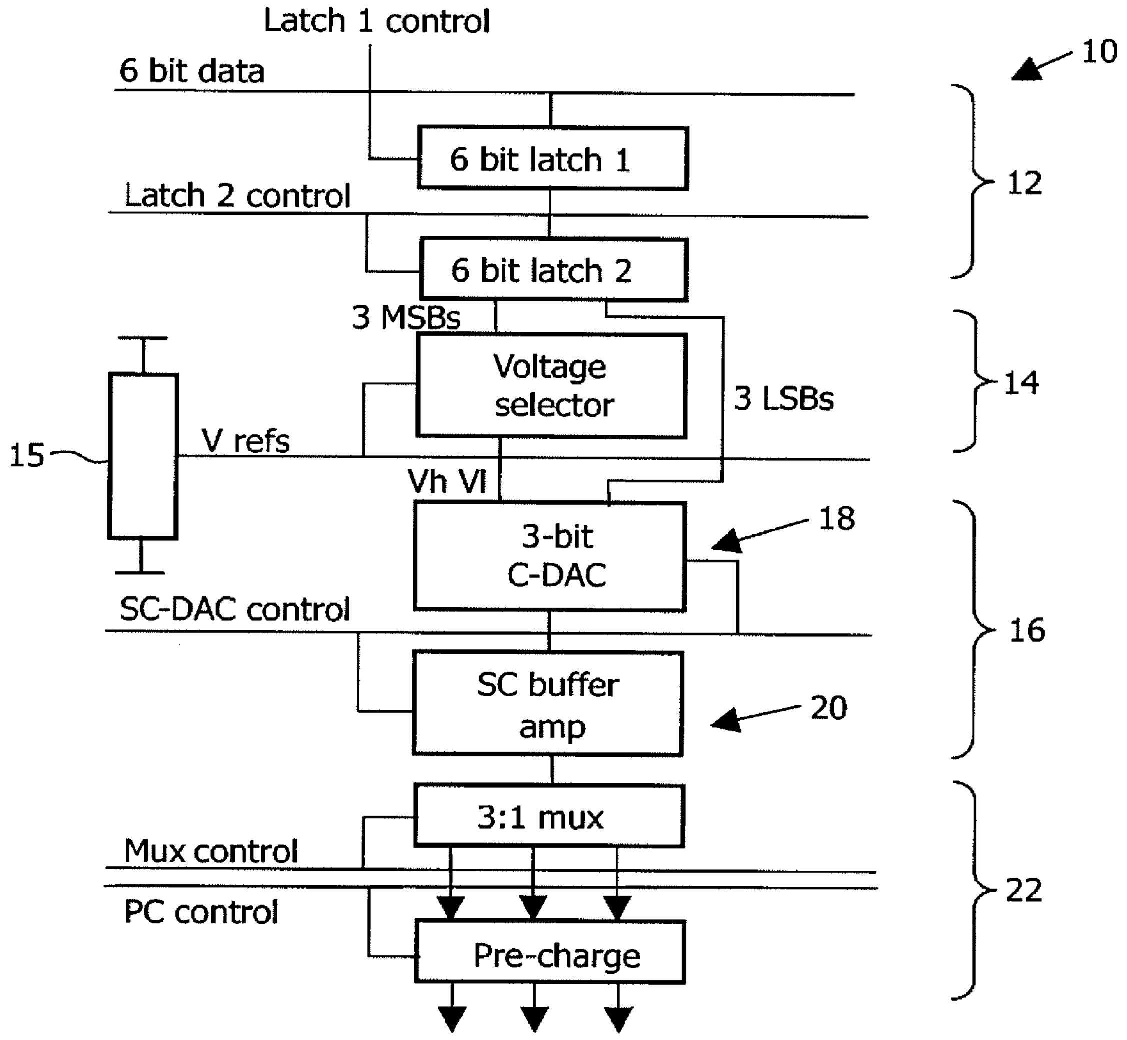
FIG. 1 (PRIOR ART)
FIG. 1 shows a known digital to analogue converter circuit.
Figure 7:
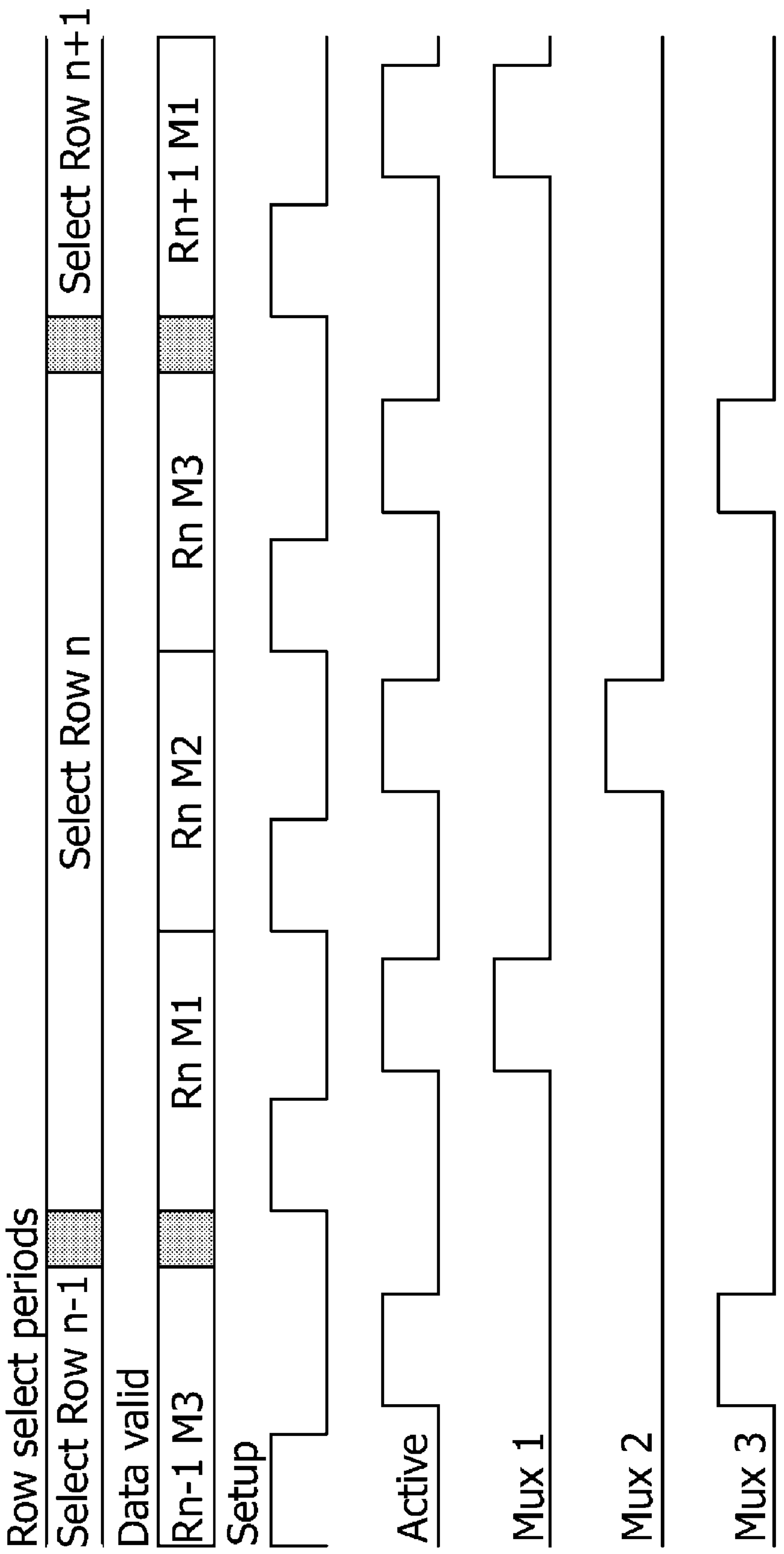
FIG. 7 shows a possible timing diagram for the circuit of FIG. 1, with the output multiplexed with a ratio of 3:1.

FIG. 7 is a possible timing diagram for the conventional circuit of FIG. 1, and shows the setup and active signals for the single switched capacitor DAC/buffer amplifier. These signals are the Ck2 and Ck1 signals (respectively) shown in FIG. 2. During each pulse of the active signal, the output is provided to one of the three multiplexed outputs. The "data valid" timing line illustrates the data at the output of the buffer amplifier. The grey areas in the row select and data valid timing lines are blanking periods inserted between the row select periods.

Figure 8:
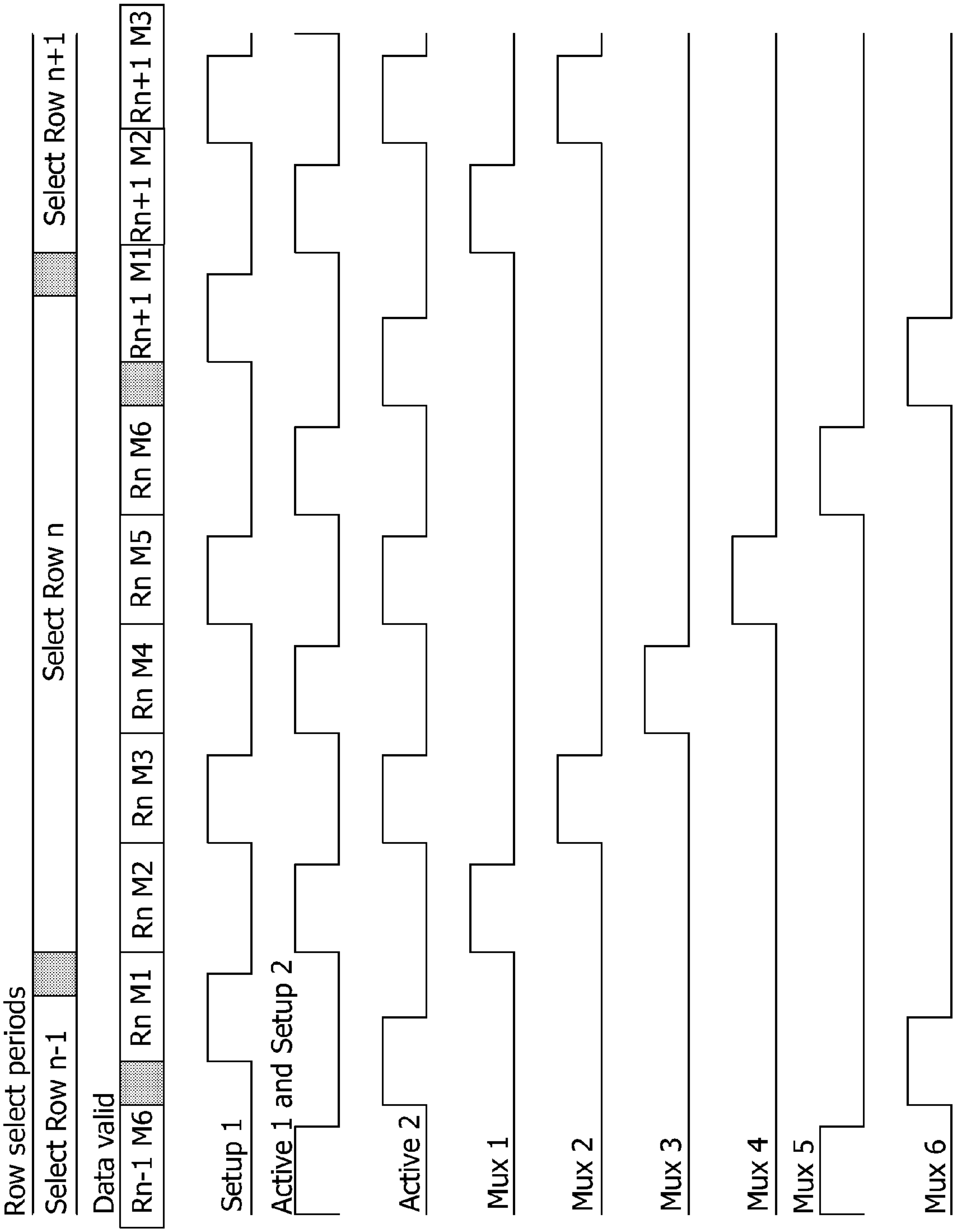
FIG. 8 shows an example of timing diagram of the invention for the circuit of FIG. 4.

FIG. 8 is an example of possible timing diagram for the circuit of FIG. 4. Each setup and active period has the same charging time as in FIG. 7.

The first pulses of "Setup1" and "Active 2" are different, as a result of the line blacking periods, shown in grey. Line blanking periods are often (but not necessarily) inserted, for example to pre-charge all the columns to a given value prior to addressing the next line. The "Active 2" pulse should follow directly after the "Setup 2" pulse (with minimum delay). However the "Setup 1" pulse has to coincide with the appropriate data valid period, which means that the two pulses are different when they coincide with the line blanking period. If no line blanking period is required, the pulse trains "Setup1" and "Active 2" could be the same. Similarly, there are alternative timing schemes for use with line blanking.

Within the same row select period, output is provided to six columns, but without doubling the amount of circuitry compared to a single 1:3 multiplexed version of the circuit of FIG. 1.

Figure 9:
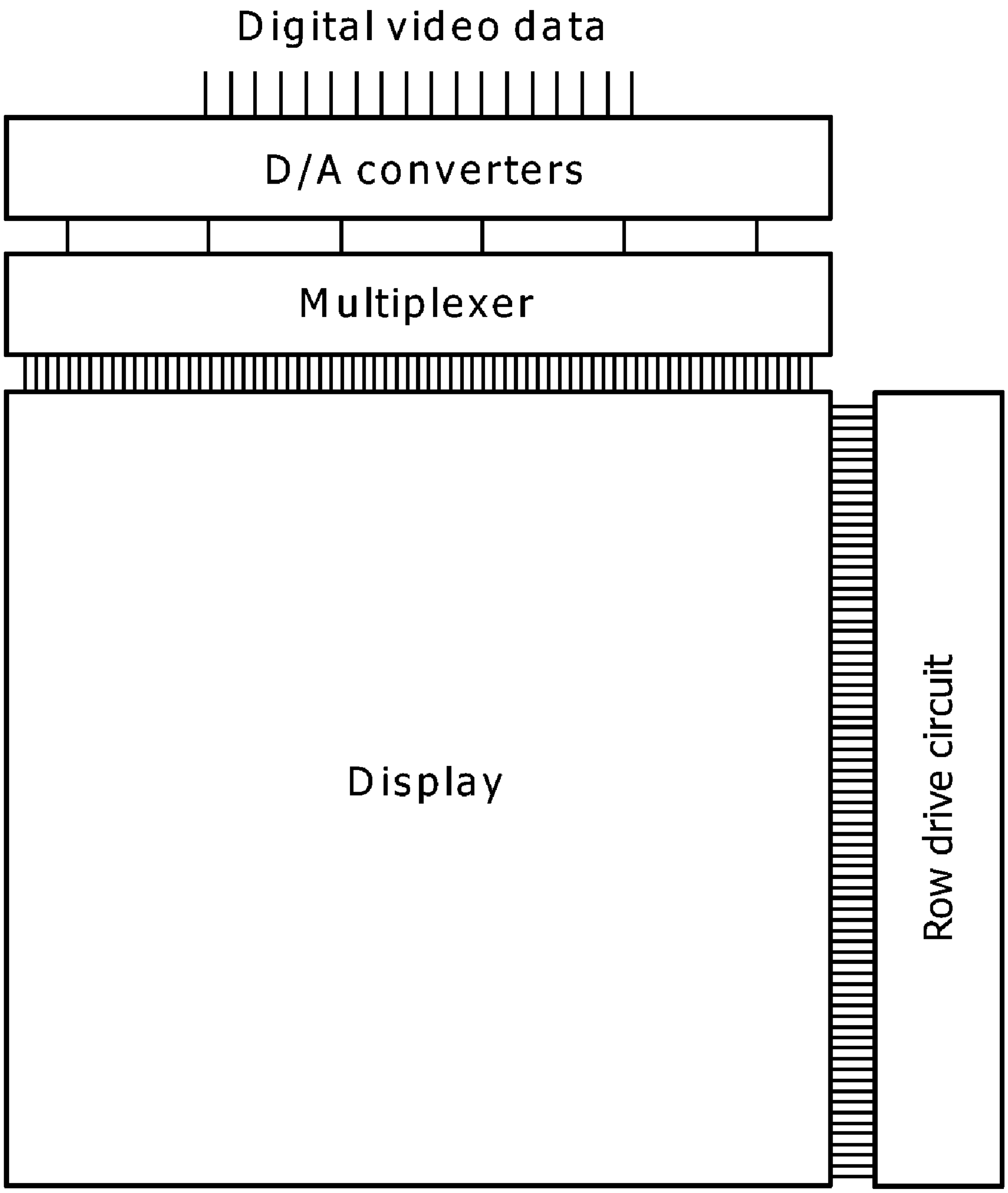
FIG. 9 shows a display device of the invention.

FIG. 9 shows a display device of the invention, using the digital to analogue converters of the invention, interfacing between digital video data and a multiplexer, for driving a display. FIG. 9 also shows the row driver circuit.

The invention is particularly suitable for displays in which the column driver circuitry is integrated onto the same substrate as the display pixel array, and using the same technology as the pixel array, for example low temperature polysilicon technology. These displays may for example be LCD or electroluminescent (such as organic light emitting diode) displays. However, the invention is not limited to these particular applications, and will find uses for DAC circuits in other applications, whether or not the DAC is to be integrated onto the same substrate as other matrix array devices.

In the detailed example above, the DAC is used for converting 6 bit digital data, and furthermore 3 bits are used for voltage rail selection and 3 bits are used for level selection between those rails. The invention can of course be applied to other sizes of digital data, and furthermore the split between LSBs and MSBs does not need to be equal.

The invention concerns specifically the implementation of the part of the DAC which derives an analogue level from the LSBs. The other parts of the DAC circuit have not been described in great detail, nor have numerous alternative possible implementations been given. Variations will, however, be apparent to those skilled in the art. For example, a DAC using a two stage latching arrangement has been shown, but this is in no way essential. Similarly, the use of a precharge circuit is not essential, and the implementation of the precharge circuit, if desired, will be routine to those skilled in the art.

In the example above, two LSB converter circuits are used, and this can be implemented without increasing the number of clock signals requires, as each converter circuit requires two clock signals for the two different modes of operation.

The invention can be implemented with more than 2 parallel LSB converter circuits, although this will require more complicated timing arrangements to enable only one of the circuits to receive the MSB DAC voltage rails at a time. An increase in the number of LSB DAC circuits will increase the time required between successive outputs of each converter circuit, or else increase the area required for each converter circuit to have a shorter settling time, but this may again give rise to a further reduction in circuit area required per column.

These further possibilities are also intended to be within the scope of the invention as claimed.

The detailed example is thus one preferred implementation for explaining the operation of the invention, and the invention as claimed can be applied to numerous other applications of digital to analogue converter circuits, both for display and non-display applications.

The invention claimed is:

1. An active matrix array device comprising an array of individually addressable matrix elements and driver circuitry for providing address signals to the matrix elements, the driver circuitry including digital to analogue converter circuitry for converting a digital pixel matrix element signal to an analogue drive level, wherein the digital to analogue converter circuitry comprises:

a voltage selector for selecting a pair of voltages based on a first set of bits of the digital matrix element signal; and a converter arrangement for providing an analogue voltage level derived from the pair of voltages and from a second set of bits of the digital matrix element signal, wherein the converter arrangement comprises first and second digital to analogue converter circuits in parallel and which are adapted to provide an analogue voltage level to an output of the converter arrangement alternately, wherein the pair of voltages and the second set of bits are provided as inputs to each of the first and second digital to analogue converter circuits, wherein each of the first digital to analogue converter circuit and second digital to analogue converter circuit comprises an amplifier and a capacitor input arrangement connected to the amplifier input, wherein the output of the amplifier provides the output of the converter arrangement, wherein a respective one of the pair of voltages is coupled to an input side of each capacitor of the capacitor arrangement through a respective input switch arrangement, and an output side of each capacitor of the capacitor arrangement is coupled to the amplifier input.

2. A device as claimed in claim 1, wherein the input side of each capacitor of the capacitor arrangement is coupled to the output of the amplifier through a respective feedback switch.

3. A device as claimed in claim 2, wherein each feedback switch is controlled with the same timing, and the feedback switches are closed only when the input switches are open.

4. A device as claimed in claim 1, wherein each digital to analogue converter circuit is operable in two modes; a charging mode and an output mode, and wherein when one of the first and second digital to analogue converter circuits is operated in the charging mode, the other is operated in the output mode.

5. A device as claimed in claim 4, wherein the mode of each digital to analogue converter circuit is controlled by at least one respective clock signal.

6. A device as claimed in claim 5, wherein the corresponding clock signals of the two digital to analogue converter circuits have non-overlapping high levels.

7. A device as claimed in claim 1, wherein the converter arrangement is for n-bit digital to analogue conversion where n is the number of bits of the second set.

8. A device as claimed in claim 1, wherein the first set comprises the most significant bits and the second set comprises the least significant bits of the digital matrix element signal.

9. A device as claimed in claim 8, wherein the digital matrix element signal is 6 bits, and the first and second sets each comprise 3 bits.

10. A device as claimed in claim 1, wherein the digital to analogue converter circuitry comprises a plurality of voltage selectors and a plurality of converter arrangements.

11. A device as claimed in claim 10, wherein one voltage selector and one converter arrangement is for providing analogue voltage levels to a plurality of matrix elements, the device further comprising for each voltage selector and converter arrangement, a multiplexer circuit for switching between the plurality of matrix elements.

12. A device as claimed in claim 1, wherein the pair of voltages is selected from a plurality of output voltages of a resistor string.

13. A device as claimed in claim 1, comprising an active matrix display.

14. A device as claimed in claim 1, wherein the driver circuitry is integrated onto the same substrate as the array of matrix elements.

15. A device as claimed in claim 14, wherein the driver circuitry is implemented using a low temperature polysilicon process.

16. The active matrix array device of claim 1 in which each of the first and second digital to analogue converter circuits is adapted to receive the pair of voltages.

17. The active matrix array device of claim 1 in which the first set of bits comprise most significant bits of the digital matrix element signal, and the second set of bits comprise least significant bits of the digital matrix element signal.

18. An active matrix array device comprising an array of individually addressable matrix elements and driver circuitry for providing address signals to the matrix elements, the driver circuitry including digital to analogue converter circuitry for converting a digital pixel matrix element signal to an analogue drive level, wherein the digital to analogue converter circuitry comprises:

a voltage selector for selecting a pair of voltages based on a first set of bits of the digital matrix element signal; and a converter arrangement for providing an analogue voltage level derived from the pair of voltages and from a second set of bits of the digital matrix element signal, wherein the converter arrangement comprises an amplifier and a switched capacitor input arrangement connected to the amplifier input, the switched capacitor input arrangement comprising a plurality of capacitors each having an input side and an output side, the input side of each capacitor for receiving one of the pair of voltages, the output side of each capacitor for coupling to an input of the amplifier, wherein the output of the amplifier provides the output of the converter circuit, and wherein the input side of each capacitor of the capacitor arrangement is coupled to the output of the amplifier through a respective feedback switch, and wherein the converter arrangement comprises first and second digital to analogue converter circuits connected in parallel and adapted to provide an analogue voltage level to an output of the converter arrangement alternately, wherein the pair of voltages and the second set of bits are provided as inputs to each of the first and second digital to analogue converter circuits.

19. A device as claimed in claim 18, wherein a respective one of the pair of voltages is coupled to an input side of each capacitor of the capacitor arrangement through a respective input switch arrangement, and an output side of each capacitor of the capacitor arrangement is coupled to the amplifier input.

20. A device as claimed in claim 19, wherein each feedback switch is controlled with the same timing, and the feedback switches are closed only when the input switches are open.

21. Digital to analogue converter circuitry for converting a digital signal to an analogue drive level, comprising:

a voltage selector for selecting a pair of voltages based on a first set of bits of the digital signal; and a converter arrangement for providing an analogue voltage level derived from the pair of voltages and from a second set of bits of the digital signal, comprising digital to analogue converter circuits in parallel which are adapted to provide an analogue voltage level to an output of the converter arrangement alternately, wherein the pair of voltages and the second set of bits are provided as inputs to each of the digital to analogue converter circuits, wherein each of the analogue converter circuits comprises an amplifier and a capacitor input arrangement connected to the amplifier input, wherein the output of the amplifier provides the output of the converter arrangement, wherein a respective one of the pair of voltages is coupled to an input side of each capacitor of the capacitor arrangement through a respective input switch arrangement, and an output side of each capacitor of the capacitor arrangement is coupled to the amplifier input.

22. Circuitry as claimed in claim 21, wherein each digital to analogue converter circuit comprises a switched capacitor circuit.

23. Digital to analogue converter circuitry for converting a digital signal to an analogue drive level, comprising:

a voltage selector for selecting a pair of voltages based on a first set of bits of the digital signal; and a converter arrangement for providing an analogue voltage level derived from the pair of voltages and from a second set of bits of the digital signal, wherein the converter arrangement comprises an amplifier and a switched capacitor input arrangement connected to the amplifier input, the switched capacitor input arrangement comprising a plurality of capacitors each having an input side and an output side, the input side of each capacitor for receiving one of the pair of voltages, the output side of each capacitor for coupling to an input of the amplifier, wherein the output of the amplifier provides the output of the converter circuit, and wherein the input side of each capacitor of the capacitor arrangement is coupled to the output of the amplifier through a respective feedback switch, and wherein the converter arrangement comprises first and second digital to analogue converter circuits connected in parallel and adapted to provide an analogue voltage level to an output of the converter arrangement alternately, wherein the pair of voltages and the second set of bits are provided as inputs to each of the first and second digital to analogue converter circuits.

24. A method of providing address signals to the matrix elements of an active matrix array device comprising an array of individually addressable matrix elements, the method comprising:

selecting a pair of voltages based on a first set of bits of a digital matrix element signal; and providing an analogue voltage level derived from the pair of voltages and from a second set of bits of the digital matrix element signal, wherein the analogue voltage level is provided alternately by first and second digital to analogue converter circuits in parallel, and the pair of voltages and the second set of bits are provided as inputs to each of the first and second digital to analogue converter circuits, wherein each of the first analogue converter circuit and the second analogue converter circuit comprises an amplifier and a capacitor input arrangement connected to the amplifier input, wherein the output of the amplifier provides the output of the converter arrangement, wherein a respective one of the pair of voltages is coupled to an input side of each capacitor of the capacitor arrangement through a respective input switch arrangement, and an output side of each capacitor of the capacitor arrangement is coupled to the amplifier input.

25. The active matrix array device of claim 1 in which each of the first and second digital to analogue converter circuits is adapted to provide an analogue voltage level to the output of the converter arrangement.

26. The digital to analogue converter circuitry of claim 21 in which each of the circuits is adapted to provide an analogue voltage level to the output of the converter arrangement.

27. The method of claim 24 in which each of the first and second digital to analogue converter circuits is adapted to provide an analogue voltage level.

28. The digital to analogue converter circuitry of claim 21 in which each of the circuits is adapted to receive the pair of voltages.

29. The method of claim 24 in which each of the first and second digital to analogue converter circuits is adapted to receive the pair of voltages.

30. The active matrix array device of claim 18 in which the first set of bits comprise most significant bits of the digital matrix element signal, and the second set of bits comprise least significant bits of the digital matrix element signal.

31. The digital to analogue converter circuitry of claim 21 in which the first set of bits comprise most significant bits of the digital matrix element signal, and the second set of bits comprise least significant bits of the digital matrix element signal.

32. The digital to analogue converter circuitry of claim 23 in which the first set of bits comprise most significant bits of the digital matrix element signal, and the second set of bits comprise least significant bits of the digital matrix element signal.

33. The method of claim 24 in which the first set of bits comprise most significant bits of the digital matrix element signal, and the second set of bits comprise least significant bits of the digital matrix element signal.

* * * * *